United States Patent [19]

Murray

[11] 3,969,257

[45] July 13, 1976

[54] WASHING AND BLEACHING COMPOSITION CONTAINING BLEACH, ACTIVATOR AND A NITRILOTRICARBOXYLIC ACID COMPOUND

[75] Inventor: Leo Thomas Murray, East Brunswick, N.J.

[73] Assignee: Colgate-Palmolive Company, New York, N.Y.

[22] Filed: July 24, 1973

[21] Appl. No.: 382,065

Related U.S. Application Data

[63] Continuation of Ser. No. 165,700, July 23, 1971, abandoned, which is a continuation of Ser. No. 685,285, Nov. 24, 1967, abandoned.

[52] U.S. Cl. .................................. 252/102; 252/95; 252/99; 252/186

[51] Int. Cl.$^2$ ..................... D06L 3/00; C01B 13/00; C11D 7/54

[58] Field of Search ............... 252/95, 99, 102, 186; 8/111

[56] References Cited

UNITED STATES PATENTS

| | | | |
|---|---|---|---|
| 3,061,550 | 10/1962 | Baevsky | 252/99 |
| 3,130,165 | 4/1964 | Brocklehurst | 252/99 |
| 3,163,606 | 12/1964 | Viveen et al. | 252/99 X |
| 3,177,148 | 4/1965 | Bright et al. | 252/95 X |
| 3,185,649 | 5/1965 | Hampson et al. | 252/99 |
| 3,211,658 | 10/1965 | Hirtz et al. | 252/99 |
| 3,243,378 | 3/1966 | Stoltz et al. | 252/99 |
| 3,245,913 | 4/1966 | Matzner | 252/99 |

*Primary Examiner*—Leland A. Sebastian
*Assistant Examiner*—Christine M. Nucker
*Attorney, Agent, or Firm*—Herbert S. Sylvester; Murray M. Grill; Norman Blumenkopf

[57] ABSTRACT

Compositions suitable for bleaching and washing comprising essentially (1) a water-soluble peroxide bleaching agent, (2) an activator comprising an organic compound and (3) a nitrilotricarboxylic compound.

12 Claims, No Drawings

WASHING AND BLEACHING COMPOSITION CONTAINING BLEACH, ACTIVATOR AND A NITRILOTRICARBOXYLIC ACID COMPOUND

This application is a continuation of Ser. No. 165,700 filed July 23, 1971, now abandoned; which is a continuation of Ser. No. 685,285 filed Nov. 24, 1967, now abandoned.

The present invention relates, in general, to compositions advantageously adapted for use in connection with fabric washing and bleaching operations and the like and in particular to the provision of specific compositions for such purposes, said compositions being characterized in possessing an exceptionally high order of bleach activity.

The use of bleaching agents in connection with fabric washing operations is, of course, common practice and in many instances an acknowledged necessity. Thus, many of the detergent compositions currently available commercially invariably contain predetermined quantities of compounds promotive of bleaching activity. Compounds suitable for such purposes are well known in the art being extensively described in the published literature both patent and otherwise. Specific representatives include, for example, the chlorine bleaches as typified by the alkali metal hypochlorites, active oxygen releasing peroxide compounds including inorganic persalts such as perborates, percarbonates, perphosphates, persilicates, persulfates, hydrogen peroxide, sodium peroxide and the like. To a great extent, the more mildly acting peroxide bleaching agents are preferred for general use being possessed of a number of properties considered desirable if not mandatory in a bleaching agent including the capability of providing a fabric having a softer hand, improved absorbency, permanence of whiteness and the like. In contradistinction, many of the bleaching agents currently available commercially and belonging to the "highly active" category, are found to be subject to one or more significant disadvantages; for example, in many instances the bleaching activity of such compounds is much too severe for the problem at hand and thus the concentration employed must be confined within rather precise limits in order to minimize or avoid any possibility of impairing the material being treated such as its structural integrity. Thus, if precautionary measures in this regard are not observed, the frequency as well as severity of bleaching may be such as to materially curtail the useful life of the fabric material. In addition, many of the commerically available bleach materials are undesirably characterized in yielding fabrics exhibiting a pronounced tendency to develop spurious discoloration i.e., yellowing thereby leading to objectionable off-whites. As will be appreciated, disadvantages of the aforedescribed nature may well vitiate any margin of advantage which would otherwise accrue from the use of a given bleaching agent.

Despite the manifold advantages typifying bleaching agents of the active oxygen releasing type certain limitations have nevertheless been determined to inhere in their use. Thus, it is invaribly found that the use of elevated temperature ranges, i.e., temperatures in excess of about 80°C are imperative in order to assure maximum realization of their beneficial properties as well as requisite level of bleaching activity. In many instances, sufficient bleaching activity is obtainable solely with the use of temperatures in the neighborhood of 90°C and higher. The use of such extreme temperatures is manifestly undesirable in view of the several disadvantages necessarily entailed e.g., physical damage to the fabric resulting in shortened useful life, high probability of shrinkage, failure to afford necessary protection to dye colorants, etc. Moreover, in many instances the use of high temperature proves substantially self-defeating since such temperatures may be coterminous with those promotive of stain-setting instead of stain removal. The rather critical temperature-dependency of the peroxide, and more particularly, the persalt bleaches poses a rather serious disadvantage in view of the extensive public use of washing machines at temperatures within the range of from about 50°C to about 60°C i.e., temperatures well below those necessary to render bleaching agents of this type adequately effective for even normal household purposes. Consequently, in those instances wherein a comparatively high order of bleaching activity is mandatory or desirable at low temperatures, it is invariably necessary to employ the more strongly acting bleaching materials despite the attendant disadvantages necessarily involved.

In order to ameliorate problems of the aforedescribed nature, considerable industrial activity has centered around the research and development of techniques which would have the effect of increasing the efficiency of bleaching agents of the active oxygen releasing type within the lower temperature range and, particularly, within the range of from about 50° C to 60°C and lower. Of the techniques evolved, particularly beneficial results are purportedly obtained with those procedures involving as an essential feature the use of one or more auxiliary agents which function as activators serving to promote or otherwise augment the bleaching capacity of the peroxide material and especially within the lower temperature ranges. The function of the activator compounds can apparently be explained by reference to their property of interreacting with the peroxide bleaching agent under the conditions extent in the washing or bleaching medium whereby to liberate intermediate species which in themselves provide effective bleaching means. Thus, the activator-bleaching components serve together to provide a precursor system, their interreaction leading to the in situ generation of oxidizing species. Procedures based upon the foregoing technique make possible the realization of substantial improvement in available bleaching activity and especially with bleaching agents of the more mildly acting type e.g., the perborates, to the extent that the latter materials are rendered capable of effective use in connection with bleaching and washing operations conducted at temperatures considerably below those heretofore considered feasible. Activator compounds suitable to the aforedescribed purposes are well known in the art being extensively described in the published literature both patent and otherwise. Perhaps the salient advantage afforded by the use of activator-peroxide systems resides in their capacity to provide significant increase in bleaching activity at lower temperature in the virtual absence of many of the undesirable features characterizing the more strongly acting bleach agents thus far promulgated for such purposes e.g. fabric impairment, discoloration, etc.

In accordance with the discovery forming the basis of the present invention, it has been ascertained that activator-bleaching agent systems may be synergistically modified to advantage by the incorporation therein of a further additive whereby to yield a bleaching and/or detergent composition having significantly improved bleach activity.

Thus, a primary object of the present invention resides in the provision of bleaching and/or detergent compositions specifically and advantageously adapted for use at lower temperatures wherein one or more of the aforedescribed disadvantages are eliminated or, at least, alleviated to a substantial degree.

A further object of the present invention resides in the provision of bleaching and detergent compositions of improved properties said compositions being highly effective for use at temperatures below about 80°C.

Another object of the present invention resides in the provision of bleaching and washing compositions capable of yielding fabric materials having satisfactory absorbency, softness of hand, and resistance to discoloration upon standing, aging, etc.

Other objects of the present invention will become more apparent hereinafter as the description proceeds.

The attainment of the foregoing and related objects is made possible in accordance with the present invention which, in its broader aspects, includes the provision of bleaching compositions containing as essential ingredients (1) a stable, water soluble peroxide compound, (2) an activator comprising an organic compound capable of reaction with said peroxide in aqueous media whereby to form oxidizing species capable of providing bleaching activity and (3) a nitrile carboxylic compound selected from the group consisting of nitrilotriacetic acid and water soluble salts thereof. For convenience, nitrilotriacetic acids contemplated for use in accordance with the present invention may be represented according to the following structural formula:

$$N \equiv (CH_2COOX)_3$$

wherein X represents hydrogen or a water solubilizing cation. Representative of the latter substituents are alkali metal e.g., sodium, potassium, ammonium and the like. The nitrilotriacetic acid compounds contemplated for use in the practice of the present invention may contain further C-bonded substituents of an inert and innocuous nature such as alkyl, e.g. methyl, ethyl, etc., haloalkyl e.g., chloromethyl, Beta-chloroethyl, etc. The nature of such ingredients is not particularly critical with the implicit limitation that such substituents be devoid of any tendency to deleteriously affect the desirable properties of the nitrilotriacetic compound.

Compounds falling with the ambit of the aforedescribed definition and formula and found to be particularly beneficial for use in accordance with the present invention include without necessary limitation nitrilotriacetic acid, trisodium salt monohydrate; nitrilotriacetic acid, tripotassium monohydrate; C-monomethylnitrilotriacetic acid, sodium salt; C-dimethyl nitrilotriacetic acid, and the like. The foregoing compounds are well known in the art with methods for their preparation being described in numerous publications.

In this connection, reference is made to Beilstein, Fourth Edition, Volume IV, page 369.

The synergistic improvement in bleaching activity made possible by the compositions of the present invention is indeed somewhat surprising in view of the fact that compounds similar to the nitrilotriacetic acid derivatives and heretofore promulgated for similar use prove notably deficient as regards capacity to augment or otherwise improve the bleaching activity of bleaching agents and those of the active oxygen releasing type in particular. The effectiveness of the nitrilotriacetic acid compounds in the compositions described herein is, according to experimental evidence, apparently due to the tendency of such compounds to promote or catalyze the proliferation of peracid species serving as bleaching means, generation of the latter occurring by interaction of the peroxide bleaching agent and activator compound. Thus, polarographic studies of compositions containing sodium perborate-organic activator systems at varying temperatures, e.g., 25,40, and 60°C, indicate a significant increase in peracid, a highly effective bleaching agent, in the presence of the nitrilotriacetic acid compound.

In contradistinction, studies conducted with reference to such systems but omitting the nitrilotriacetic acid compound establish that significant reductions in peracid concentration obtain, with, of course, corresponding diminution in bleaching activity.

Nitriloacetic acid compounds have, of course, been acknowledged previously in the art as being effective sequestering agents. Thus, it has been postulated in explanation of their function in perborate-containing compositions that they serve to sequester impurities present in the aqueous media employed in the wash and/or bleaching operation. It is similarly hypothesized that such impurities are highly undesirable since they catalyze decomposition of the bleaching species present in the bleaching and/or detergent solution. Thus, the effective reduction in impurity concentration attributable to the sequestering function correspondingly enhances the amount of bleaching species available for useful purposes. Regardless of the actual mechanism involved, experimental evidence established that the significant enhancement in bleaching activity might not be explained solely by reference to the foregoing hypothesis. This conclusion seems to be warranted in view of the fact that other sequestering agents fail to provide similar improvement in bleaching activity when incorporated into peroxide-containing bleaching and/or detergent systems. Moreover, and of primary importance sequestering agents found to function satisfactorily in simple bleaching and detergent formulations, i.e., those devoid of special additives designed specifically to increase bleaching activity, prove particularly ineffective for use in peroxide-containing bleaches further provided with one or more activator compounds. Thus, it was particularly surprising to find that the nitrilotriacetic acid compounds described herein function to exceptional advantage in peroxide-containing bleaching and detergent compositions provided with one or more organic activator compounds, preferably non-metallic, increased bleaching activity being obtainable even in the absence of metal contaminants in the washing medium.

Eloquent testimony to the exceedingly high efficiency characterizing the nitrilotriacetic materials in the presence of the activator-peroxide system is the fact that such compounds may be beneficially employed in minimal concentrations. Thus, concentrations of nitrilotriacetic acid on the order of only 2 ppm of bleaching or detergent solution lead to marked increases in bleaching activity. Appreciable increases in peracid species for such systems were also noted, such observations being confirmed by titration evaluation. In any event, it has been ascertained that concentrations of nitrilotriacetic acid compound within the range of from about 0.5 to about 50 parts by weight per million parts of wash solution are eminently suitable for the vast majority of applications to which the bleach composition may be applied. Otherwise stated, it is recommended that the nitrilotriacetic acid concentration be maintained within a range sufficient to yield an NTA/peroxide mole ratio of from about 0.001 to about 0.10. Within the foregoing range optimum values may be readily determined in a particular circumstance by routine laboratory investigation. It is recognized that specific modes of operation, perculiar circumstances, etc., may dictate departures from the aforestated concentration ranges in order to successfully negotiate the problem at hand. Thus, the ranges given encompass those generally found to assure the realization of optimum results.

As previously stated, the nitrilotriacetic acid compounds described herein are beneficially adapted for use in conjunction with bleach and/or detergent systems comprising as essential ingredients a water-soluble active oxygen releasing bleaching agent and an organic activator compound. Particular advantage is found to obtain with those systems employing as the active oxygen releasing compound, a stable, water-soluble, perborate salt such as sodium perborate. The perborate bleaching agents are, as stated hereinbefore, especially attractive from the standpoint of combining effective but mild bleaching action with the capacity to provide a laundered fabric having satisfactory softness of hand, absorbency, resistance to yellowing, etc. Moreover, the mild bleaching action of the perborate gives rise to the additional advantage that relatively wide variations in concentration are permitted in the absence of any significant risk of over-bleaching. By way of contrast, many of the bleaching agents of the more highly active type heretofore suggested, are critically dependent upon concentrations and thus inadvertent changes in concentrations though minor may suffice to create severe overbleaching problems. Consequently, the concentrations of such materials must be confined within relatively precise values in order to avoid problems of this nature. As will be appreciated, formulation of compositions of the present invention comprise as essential ingredients a ternary mixture of (1) a stable water soluble peroxide bleaching agent (2) an activator comprising an organic compound capable of reaction with said peroxide bleaching agent in aqueous media whereby to form species capable of providing bleach activity and (3) a nitrilocarboxylic acid compound. The activator compounds employed for such purposes may be selected from any of those recommended in the art for use in conjunction with peroxide bleaching agents for purposes of promoting bleaching activity. Specific examples of such compounds include the following:

N-acetyl phthalimide
N-acetyl succinimide
trisacetyl cyanurate
N-benzoyl succinimide
Phenyl acetate
Acetylsalicyclic Acid
N-p-anisoyl succinimide
N-alpha-napthoyl succinimide
N-beta-napthoyl succinimide
N-benzoyl glutarimide
N-p, chlorobenzoyl succinimide
N-benzoyl succinimide
N-p-chlorobenzoyl-5,5-dimethyl hydantoin
N-o-chlorobenzoyl succinimide
N-p-chlorobenzoyl phthalimide . . . etc.

Further examples of suitable activator compounds of the imide type, both cyclic and aliphatic, are described in co-pending U.S. application Ser. No. 677,747 filed Oct. 24, 1967, now abandoned. Compounds of this type conform to the following structural formula:

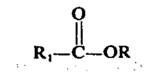

wherein R represents alkyl and preferably lower alkyl of 1 to 4 carbon atoms or aryl such as phenyl and $R_1$ represents an N-bonded imide radical. Thus, included with the foregoing structural formula are the following:

N-methoxycarbonyl saccharide
N-methoxycarbonyl phthalimide
N-ethoxycarbonyl phthalimide
N-methoxycarbonyl-5,5-dimethyl hydantoin
N-methoxycarbonyl succinimide
N-phenoxycarbonyl succinimide
N,N-di-(methoxycarbonyl) acetamide
N-methoxycarbonyl glutarimide
1, 3-di-(N-methoxycarbonyl)-hydantoin
1, 3-di-(N-methoxycarbonyl)-5,5-dimethyl hydantoin The activator compounds described in co-pending U.S. application Ser. No. 679,611 filed Nov. 1, 1967, now U.S. Pat. No. 3,655,567 are likewise eminently suitable for use in the compositions of the present invention. Compounds of this type may be represented according to the following structural formula:

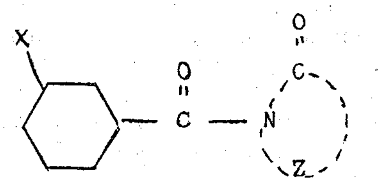

wherein X represents halogen e.g. chloro and Z represents the atoms necessary to complete a heterocyclic nucleus selected from the group consisting of hydantoin and succinimide.

Specific representatives of compounds of this type include, without necessary limitation, the following:

N-m-chlorobenzoyl-5,5-dimethyl hydantoin
N-m-chlorobenzoylsuccinimide . . . etc.

Another group of compounds found to provide highly effective activator means for peroxide bleaching agents comprise the N-sulfonated cyclic imides described in co-pending U.S. application Ser. No. 677,746 filed Oct. 24, 1967, now abandoned, of the following structural formula:

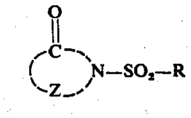

wherein R represents lower alkyl of from 1 to 4 carbon atoms and aryl and Z represents the atoms necessary to complete a heterocyclic ring selected from the group consisting of succinimide and phthalimide. Specific examples of compounds of this type include, without necessary limitation, the following:

N-benzenesulfonyl phthalimide
N-benzenesulfonyl succinimide
N-methanesulfonyl phthalimide
N-methanesulfonyl succinimide A further class of activator compounds found to be highly effective for use herein comprise the alkyl and aryl chloroformate derivatives described in co-pending application Ser. No. 677,745 filed Oct. 24, 1967, now U.S. Pat. No. 3,589,857 with specific examples including for example:

methylchloroformate
ethylchloroformate
phenylchloroformate

The relative proportions of bleaching agent and activator employed may vary over a relatively wide range depending somewhat upon the nature of the composition being formulated. In general, beneficial results may be readily obtained by the use of the activator in amounts sufficient to yield an activator-peroxide mole ratio within the range of from about 0.01 to about 2.0, with a range of from 0.1 to 2.0 being preferred. Thus, in the case of a simple bleach composition, the involved ingredients will comprise essentially, the nitrilotriacetic acid derivative, activator and peroxide. When formulating detergent compositions, the peroxide compound will ordinarily be utilized in amounts sufficient to yield a concentration within the range of from about 1% to about 50%, weight basis, of total composition, with other ingredients including detergent, brightener, perfume, etc. It will be understood that the aforementioned limits are not critical per se but serve only to define those values found to yield optimum results for the broad spectrum of operations to which such compositions may be applied.

The manner in which the activator material is incorporated into the composition will depend primarily upon the physical state in which it is provided. Thus, in those instances wherein the activator compound is provided in liquid form, any of the conventional encapsulating techniques may be availed upon for purposes of supplying the activator in form suitable for admixing with the remaining ingredients of the bleach and/or detergent composition. Feasible techniques for so providing liquid activator materials are, as stated, well known in the art being extensively described in numerous publications both patent and otherwise.

A further embodiment of the present invention contemplates the use of the activator in coated form i.e., covered with a solid material soluble in the washing and/or bleaching solution. Coating materials suitable for such use are well known in the art including, for example, a wide variety of polymeric materials such as polyethylene glycols, condensation products of ethylene oxide, propylene oxide, etc., polyvinyl alcohol, carboxy methylcellulose, cetyl alcohol, fatty acid alkanolamides, etc. It is preferred practice to granulate the activator compounds prior to coating with the forementioned polymer materials. The provision of the bleach activator in coated form presents the additional advantage that the shelf life is enhanced significantly and especially in those instances wherein the product composition is provided in powder form. The coating of the activator granules can be readily accomplished according to any of the customary methods described in the art for such purposes. Thus, the coating material may be dissolved in water or organic solvent and thereafter spray-applied to the activator compound provided in finely divided form and thereafter dried.

The activator and peroxide bleaching agent may be formulated together in a built detergent composition or alternatively as a separate bleach product. When provided in the latter form, the activator and bleach may be either intimately mixed or included in separate compartments of a water soluble film packet.

The following examples are given for purposes of illustration only and are not to be considered as necessarily constituting a limitation on the present invention.

Compositions exemplary of those contemplated by the present invention are evaluated according to a wash procedure comprising the following sequence of operations. A series of detergent compositions is prepared in tergotometer buckets by dissolving in 1,000 ml of water 2.0 grams of a commercial detergent, devoid of brightener, of the following composition:

21% linear tridecyl benzene sulfonate sodium salt
26.4% sodium sulfate
35% phosphates
  tripolyphosphate, sodium
  tri-sodium-ortho-phosphate
  pyrophosphate, sodium
7% sodium silicate
0.4% carboxymethylcellulose, sodium with the remainder comprising antioxidant, perfume, etc.

Sodium perborate where used is added in amounts sufficient to yield a concentration of $2 \times 10^{-3}$ M. Activators where used are added in the concentrations specified. The concentration of nitrilotriacetic acid trisodium salt monohydrate is maintained at 20 ppm in those instances where used. In each instance, the washing treatment is conducted for the time interval specified at a temperature of 120°F. followed by rinsing and air drying. The average reflectance unit reading (Rd) is determined both before and after washing, the difference therebetween being represented in the table by ΔRd for each of the systems set forth. The results obtained are itemized in the accompanying table.

The disparity in ΔRd values for the various control samples as well as corresponding differences in ΔRd for common bleach systems is due primarily to the conditions of testing. Thus, the saturation and color density of the stain varied due to slight differences in period of immersion of the swatch sample in the stain media, receptivity, absorptivity of the cotton swatch for the stain media, etc. However, each of the samples comprising a given test set possessed approximately equal initial stain densities thereby providing a valid basis for comparison.

TABLE

| Ex. No. | Washing Period(Min.) | Stain | Activator Compound | Conc.(Mx103) | NTA | ΔRd |
|---|---|---|---|---|---|---|
| 1.(a) | 25 | grape | — | — | — | 39.2 |
| (b) | 25 | " | ASCA* | 2.0 | — | 40.9 |
| (c) | 25 | " | " | 2.0 | Yes | 42.0 |
| 2.(a) | 30 | sulfurdye | — | — | — | 3.5 |
| (b) | 30 | " | ASCA* | 2.0 | — | 3.5 |
| (c) | 30 | " | " | 2.0 | Yes | 5.0 |
| 3.(a) | 60 | sulfurdye | — | — | — | 4.9 |
| (b) | 60 | " | ASCA* | 2.0 | — | 4.6 |
| (c) | 60 | " | " | 2.0 | Yes | 8.5 |
| 4.(a) | 10 | sulfurdye | TACA** | 0.8 | — | 3.0 |
| (b) | 10 | " | " | 0.8 | Yes | 3.4 |
| 5.(a) | 30 | sulfurdye | TACA** | 1.6 | — | 9.9 |
| (b) | 30 | " | " | 1.6 | Yes | 10.4 |
| (c) | 30 | " | " | 0.8 | — | 4.0 |
| (d) | 30 | " | " | 0.8 | Yes | 5.8 |
| 6.(a) | 10 | grape | PA*** | 2.0 | — | 50.5 |
| (b) | 10 | " | " | 2.0 | Yes | 51.7 |
| 7.(a) | 15 | coffee-tea | — | — | — | 1.3 |
| (b) | 15 | " | PA*** | 2.0 | — | 5.1 |
| (c) | 15 | " | " | 2.0 | Yes | 5.9 |

ASCA* - acetylsalicylic acid
TACA** - triacetylcyanurate
PA*** - phenyl acetate
Ex. Nos. 1–3 distilled water
Ex. Nos. 4–7 tap water As the summarized data makes manifestly clear, significant improvement in washing and bleaching activity obtains in those instances wherein the nitrilotriacetic acid is present in the composition. Moreover such improvement is realized without regard to the nature of the stain i.e., grape, coffee-tea or sulfurdye. As will be noted by reference to example 1, the inclusion of the activator material along with the perborate provides some measure of improvement permitting an increase in ΔRd from 39.2 to 40.9. This result would be expected in view of the property of activator compounds to promote the proliferation of bleaching species under the conditions extant in conventional detergent and/or bleaching operations. As will also be observed, further and pronounced improvement in bleaching activity as indicated by significant increase in ΔRd results when the activator-peroxide system is further modified by the inclusion of the nitrilotriacetic compound. The results itemized in examples 2 and 3 would tend to indicate that the presence of the activator material is for the most part inconsequential with the treatment of sulfurdye fabrics. Thus, no observable distinction in results occurs with the washing of sulfurdye fabrics with compositions containing either the perborate alone or, alternatively, the perborate in conjunction with activator. In each instance a ΔRd value of 3.5 is noted. However, the addition of nitrilotriacetic acid to the perborate-activator system makes possible the realization of substantial improvement in bleaching activity as evidenced by the rather marked increases in measured ΔRd i.e., an increae from 3.5 to 5.0. Similar improvement in bleaching activity is realized when the washing period is extended to 60 minutes. The results itemized in example 4 point up a further advantage of the compositions described herein in that appreciable increases in bleaching activity is obtainable despite the use of washing periods on the order of only 10 minutes.

As mentioned hereinbefore, the compositions described herein can be provided in the form of a bleaching composition or, alternatively, in the form of a built detergent product. Organic detergents suitable for use in accordance with the present invention encompass a relatively wide range of materials and may be of the anionic, non-ionic, cationic or amphoteric types.

The anionic surface active agents include those surface active or detergent compounds which contain an organic hydrophobic group and an anionic solubilizing group. Typical examples of anionic solubilizing groups are sulfonate, sulfate, carboxylate, phosphenate and phosphate. Examples of suitable anionic detergents which fall within the scope of the invention include the soaps, such as the water-soluble salts of higher fatty acids or rosin acids, such as may be derived from fats, oils, and waxes of animal, vegetable or marine origin, e.g., the sodium soaps of tallow, grease, coconut oil, tall oil and mixtures thereof; and the sulfated and sulfonated synthetic detergents, particularly those having about 8 to 26, and preferably about 12 to 22, carbon atoms to the molecule.

As examples of suitable synthetic anionic detergents there may be cited the higher alkyl mononuclear aromatic sulfonates such as the higher alkyl benzene sulfonates containing from 10 to 16 carbon atoms in the alkyl group in a straight or branched chain, e.g., the sodium salts or decyl, undecyl, dodecyl, (lauryl), tridecyl, tetradecyl, pentadecyl, or hexadecyl benzene sulfonate and the higher alkyl toluene, xylene and phenol sulfonates; alkyl naphthalene sulfonate, ammonium diamyl naphthalene sulfonate, and sodium dinonyl naphthalene sulfonate.

Other anionic detergents are the olefin sulfonates, including long chain alkene sulfonates, long chain hydroxyalkane sulfonates or mixtures of alkenesulfonates and hydroxyalkanesulfonates. These olefin sulfonate detergents may be prepared, in known manner, by the reactin of $SO_3$ with long chain olefins (of 8–25, preferably 12–21 carbon atoms) of the formula $RCH{=}CHR_1$, where R is alkyl and $R_1$ is alkyl or hydrogen, to produce a mixture of sultones and alkenesulfonic acids, which mixture is then treated to convert the sultones to sulfonates. Examples of other sulfate or sulfonate detergents are paraffin sulfonates, such as the reaction products of alpha olefins and bisulfites (e.g. sodium bisulfite), e.g. primary paraffin sulfonates of about 10–20, preferably about 15–20, carbon atoms; sulfates of higher alcohols; salts of α-sulfofatty esters (e.g. of about 10 to 20 carbon atoms, such as methyl α-sulfomyristate or α-sulfotallowate).

Examples of sulfates of higher alcohols are sodium lauryl sulfate, sodium tallow alcohol sulfate. Turkey Red Oil or other sulfated oils, or sulfates or mono- or diglycerides of fatty acids (e.g. stearic monoglyceride monosulfate), alkyl poly (ethenoxy) ether sulfates such as the sulfates of the condensation products of ethylene oxide and lauryl alcohol (usually having 1 to 5 ethenoxy groups per molecule); lauryl or other higher alkyl glyceryl ether sulfonates; aromatic poly (ethenoxy) ether sulfates such as the sulfates of the condensation products of ethylene oxide and nonyl phenol (usually having 1 to 20 oxyethylene groups per molecule perferably 2–12).

The suitable anionic detergents include also the acyl sarcosinates (e.g. sodium lauroylsarcosinate) the acyl esters (e.g. oleic acid ester) of isethionates, and the acyl N-methyl taurides (e.g. potassium N-methyl lauroyl- or oleyl tauride).

The most highly preferred water soluble anionic detergent compounds are the ammonium and substituted ammonium (such as mono-, di- and triethanolamine), alkali metal (such as sodium and potassium) and alkaline earth metal (such as calcium and magnesium) salts of the higher alkyl benzene sulfonates, olefin sulfonates, the higher alkyl sulfates, and the higher fatty acid monoglyceride sulfates. The particular salt will be suitably selected depending upon the particular formulation and the proportions therein.

Nonionic surface active agents include those surface active or detergent compounds which contain an organic hydrophobic group and a hydrophilic group which is a reaction product of a solubilizing group such as carboxylate, hydroxyl, amido or amino with ethylene oxide or with the polyhydration product thereof, polyethylene glycol.

As examples of nonionic surface active agents which may be used there may be noted the condensation products of alkyl phenols with ethylene oxide, e.g., the reaction product of is ooctyl phenol with about 6 to 30 ethylene oxide units; condensation products of alkyl thiophenols with 10 to 15 ehtylene oxide units; condensation products of higher fatty alcohols such as tridecyl alcohol with ethylene oxide; ethylene oxide addends of monoesters of hexahydric alcohols and inner ethers thereof such as sorbitan monolaurate, sorbitol monooleate and mannitan monopalmitate, and the condensation products of polypropylene glycol with ethylene oxide.

Cationic surface active agents may also be employed. Such agents are those surface active detergent compounds which contain an organic hydrophobic group and a cationic solubilizing group. Typical cationic solubilizing groups are amine and as quaternary groups.

As examples of suitable synthetic cationic detergents there may be noted the diamines such as those of the type $RNHC_2H_4NH_2$ wherein R is an alkyl group of about 12 to 22 carbon atoms, such as N-2-aminoethyl stearyl amine and N-2-aminoethyl myristyl amine; amide-linked amines such as those of the type $R^1CONHC_2H_4NH_2$ wherein R is an alkyl group of about 9 to 20 carbon atoms, such as N-2-amino ethyl-stearyl amide and N-amino ethyl myristyl amide; quaternary ammonium compounds wherein typically one of the groups linked to the nitrogen atom are alkyl groups which contain 1 to 3 carbon atoms, including such 1 to 3 carbon alkyl groups bearing inert substituents, such as phenyl groups, and there is present an anion such as halogen, acetate, methosulfate, etc. Typical quaternary ammonium detergents are ethyl-dimethyl-stearyl ammonium chloride, benzyl-dimethyl-stearyl ammonium chloride benzyl-dimethyl-stearyl ammonium chloride, trimethyl stearyl ammonium chloride, trimethyl-cetyl ammonium bromide, dimethyl-ethyl dilauryl ammonium chloride, dimethyl-propyl-myristyl ammonium chloride, and the corresponding methosulfates and acetates.

Examples of suitable amphoteric detergents are those containing both an anionic and a cationic group and a hydrophobic organic group, which is advantageously a higher aliphatic radical, e.g. of 10-20 carbon atoms. Among these are the N-long chain alkyl aminocarboxylic acids (e.g. of the formula $$R-\overset{\overset{R_2}{|}}{N}-R'-COOM);$$

the N-long chain alkyl iminodicarboxylic acids (e.g. of the formula $RN(R'COON)_2$) and the N-long chain alkyl betaines (e.g. of the formula $$R^+-\underset{R_4}{\overset{R_3}{N}}-R'-COO-)$$

where R is a long chain alkyl group, e.g. of about 10–20 carbons, R' is a divalent radical joining the amino and carboxyl portions of an amino acid (e.g. an alkylene radical of 1–4 carbon atoms), H is hydrogen or a salt-forming metal, $R^2$ is a hydrogen or another monovalent substituent (e.g. methyl or other lower alkyl), and $R^3$ and $R^4$ are monovalent substituents joined to the nitrogen by carbon-to-nitrogen bonds (e.g. methyl or other lower alkyl substituents). Examples of specific amphoteric detergents ar N-alkyl-beta-aminopropionic acid; N-alkyl-beta-iminodipropionic acid, and N-alkyl, N,N-dimethyl glycine; the alkyl group may be, for example, that derived from coco fatty alcohol, lauryl alcohol, myristyl alcohol (or a lauryl-myristyl mixture), hydrogenated tallow alcohol, cetyl, stearyl, or blends of such alcohols. The substituted aminopropionic and iminodipropionic acids are often supplied in the sodium or other salt forms, which may likewise be used in the practice of this invention. Examples of other amphoteric detergents are the fatty imidazolines such as those made by reacting a long chain fatty acid (e.g. of 10 to 20 carbon atoms) with diethylene triamine and monohalocarboxylic acids having 2 to 6 carbon atoms, e.g. 1-coco-5-hydroxethyl-5-carboxymethylimidazoline; betaines containing a sulfonic group instead of the carboxylic group; betaines in which the long chain substituent is joined to the carboxylic group without an intervening nitrogen atom, e.g. inner salts of 2-trimethylamino fatty acids such as 2-trimethylaminolauric acid, and compounds of any of the previously mentioned types but in which the nitrogen atoms is replaced by phosphorus.

The detergent composition may further contain one or more water-soluble builder salts which may be either organic or inorganic in nature. Suitable representatives include the following:

Trisodium phosphate,
Tetrasodium pyrophosphate,
Sodium acid pyrophosphate,
Sodium tripolyphosphate,
Sodium monobasic phosphate,
Sodium dibasic phosphate,
Sodium hexamethaphosphate,
Sodium metasilicate, Sodium silicates, $Na_2O/SiO_2$ of 1/1.6 to 1/3.2
Sodium carbonate,
Sodium sulfate,
Borax Ethylene diamine tetraacetic acid tetrasodium salts, etc. Mixtures of two or more inorganic or organic salts can be used, as can mixtures of inorganic and organic salts.

Particularly preferred herein are water-soluble, alkali metal polyphosphate builder salts. These salts form water-soluble complexes with calcium and magnesium ions found in hard water and thereby prevent the formation of insoluble salts which tend to deposit upon textiles during a washing cycle. Further, such phosphates enhance the detersive efficiency of anionic detergents, aid in controlling sudsing powers and aid in keeping soil suspended in the washing bath after its removal from the soiled textiles.

Various other materials may be included in compositions of the invention, whether in solid or liquid form, by addition in known manner to the aqueous mixtures or to the solidified product. Examples thereof are the higher fatty acid amines such as coconut or lauric monoethanolamide isopropanolamide and the like; hydrotropic solubilizing agents such as xylene or toluene sulfonates; organic solubilizing agents such as ethanol, ethylene glycol and hexylene glycol; sodium carboxymethylcellulose and polyvinyl alcohol antiredeposition agents; optical and fluorescent brightener materials; coloring agents; corrosion inhibiting agents; germicides; perfumes; bluing agents; and the like.

Preferred compositions advantageously contain a hydrophobic colloidal soil-suspending agent which is soluble or dispersible in water also. The joint use of the combination of the cellulosic compound and polyvinyl alcohol is particularly effective for soil-suspension properties during the washing of a variety of fabrics, including both cotton and synthetic fibers such as nylon, Dacron and resin-treated cottons. The mixtures is used preferably in a total amount of 0.1 to 2 percent by weight of solids. Preferred cellulosic compounds are the alkali metal salts of a carboxy lower alkyl cellulose having up to 3 carbons in the alkyl group, such as the sodium and potassium salt of carboxymethylcellulose. Suitable salts are sodium carboxyethylcellulose; the cellulose sulfates and lower alkyl and hydroxyalkylcellulose ethers such as methyl-, ethyl-, and hydroxyethylcellulose.

The proportions of such ingredients are not particularly critical and may be selected so as to conform with established practice. In any event, the detergent agent is usually employed in concentrations ranging from about 2% to about 50% by weight of the composition. The builder salts, whether organic or inorganic, are preferably employed in concentrations ranging from about 10% to about 95% by weight of the composition. A typical representative of the bleach formulations encompassed by the foregoing definition would include, for example, the following:

| | parts by weight |
|---|---|
| Sodium carbonate | 5 |
| Sodium tripolyphosphate | 30 |
| Sodium perborate | 22 |
| Trisacetylcyanuric acid | 29 |
| Nitrilotriacetic acid trisodium salt | 1.5 |

-continued

| | |
|---|---|
| Alkylbenzene sulfonate | 2 |

with the remainder comprising, on a 100 part total basis, sodium sulfate, brightener, perfume, etc. It is to be understood that the above formulation is given solely for purposes of illustration; thus departure from the specific concentration values given may be dictated in a particular circumstance depending upon the requirements of the processor.

EXAMPLES 8–11

The procedure described in the foregoing examples is repeated but employing in lieu of the activator material specified, the following:

| Ex. No. | Activator |
|---|---|
| 8 | N-acetyl phthalimide |
| 9 | N-benzenesulfonyl phthalimide |
| 10 | N-acetyl succinimide |
| 11 | N-benzoyl succinimide |

In each case inmprovement in bleaching activity similar to that described in the foregoing examples is obtained i.e., the observed ΔRd values establish definite superiority for the NTA/activator/perborate system. The superior bleaching activity is explainable by reference to the fact that a series of titration analyses confirmed by the presence of significantly higher peracid concentrations with the NTA/activator/perborate system in a detergent composition when compared to similarly prepared systems but omitting the NTA. In the tests conducted, the N-acetyl phthalimide, N-benzenesulfonyl phthalimide and N-benzoyl succinimide are incorporated into the detergent system in the form of a slurry in 5 ml of ethanol whereas the N-acetyl succinimide is incorporated in the form of a solution in 5 ml of ethanol.

Similar improvement in bleaching activity is likewise obtained when the procedures described in the foregoing examples are repeated but employing in lieu of the activator material specified, equivalent amounts of the following:

N-methoxycarbonyl phthalimide
N-methoxycarbonyl,5,5-dimethylhydantoin
N,N-di-(methoxycarbonyl) acetamide
1,3-di-(N-methoxycarbonyl) hydantoin
N-m-chlorobenzoyl-5-5,-dimethyl hydantoin
N-m-chlorobenzoylsuccinimide
methylchloroformate
phenylchloroformate Results similar to those obtained in the foregoing examples are likewise obtained when the sodium perborate is replaced wth equivalent amounts of one or more of the other peroxide bleaching agents described hereinbefore, such as sodium percarbonate, sodium persilicate, etc.

The terminology "water-soluble peroxide", "persalt" bleaching agent as used herein is intended to connote those compounds which give rise to hydrogen peroxide when dissolved in water. Thus, the peroxide compounds hereinbefore described as being suitable in the practice of the present invention are believed to contain hydrogen peroxide of crystallization.

Although the subject invention has been described and exemplified with particular reference to nitrilotriacetic acid compounds, it will be understood that the invention is not necessarily restricted thereto. Thus, it has been ascertained that ethylenediamine tetraacetic acid, trisodium hydroxyalkyl ethylenediamine triacetate, and pentasodium salt of diethylenetriamine pentaacetic acid are in many instances capable of providing comparable improvement in bleaching activity, i.e., when utilized in conjunction with the activator compounds described hereinbefore and water-soluble bleaching agent.

The bleaching composition of the present invention may be effectively employed over a relatively wide range of pH values in the absence of appreciable risk of damage to the fabric material being treated. The desired pH may be readily achieved by the addition of suitable buffering agents to the bleaching solution or alternatively high pH values, they may be readily used in combination with common household laundry soaps and detergents for preventive bleaching of fibers materials. For the vast majority of bleach and/or washing applications, a pH within the range of from about 6 to 10 is recommended.

The present invention has been described with respect to certain preferred embodiments thereof and there will become obvious to persons skilled in the art other variations, modifications and equivalents which are to be understood as coming within the scope of the present invention.

What is claimed is:

1. A bleaching composition consisting essentially of (1) a stable, water-soluble inorganic peroxide bleaching agent, (2) an activator capable of reaction with said peroxide in aqueous media whereby to form oxidizing species capable of providing bleaching activity, said activator being selected from the group consisting of N-acetyl phthalimide, N-benzene-sulfonyl phthalimide, N-acetyl succinimide, and N-benzoyl succinimide and (3) a nitrilotricarboxylic compound selected from the group consisting of nitrilotriacetic acid and water-soluble sodium potassium or ammonium salts thereof, the nitrilotricarboxylic compound being present in an amount sufficient to improve the bleaching effectiveness of the composition, the activator-peroxide mol ratio being within the range of from about 0.01 to about 2.0, and the nitrilotricarboxylic compound-peroxide mol ratio being within the range of from 0.001 to 0.10.

2. A composition according to claim 1 wherein N-acetyl phthalimide is the activator.

3. A composition according to claim 1 wherein N-benzenesulfonyl phthalimide is the activator.

4. A composition according to claim 1 wherein N-acetyl succinimide is the activator.

5. A composition according to claim 1 wherein N-benzoyl succinimide is the activator.

6. A bleaching composition consisting essentially of (1) a stable, water-soluble inorganic peroxide bleaching agent, (2) an activator which is an organic carboxylic imide capable of reaction with said peroxide in aqueous media whereby to form oxidizing species capable of providing bleaching activity and (3) a compound selected from the group consisting of nitrilotriacetic acid and water-soluble sodium potassium or ammonium salts thereof, the nitrilotricarboxylic compound being present in an amount sufficient to improve the bleaching effectiveness of the composition, the activator-peroxide mol ratio being within the range of from about 0.01 to about 2.0 and the nitrilotricarboxylic compound-peroxide mol ratio being within the range of from 0.001 to 0.10.

7. A composition according to claim 6 wherein said nitrilotricarboxylic compound consists essentially of nitrilotriacetic acid trisodium salt monohydrate and said imide is an N-acylated imide and said composition contains sodium tripolyphosphate in amounts ranging from about 10% to about 95% by weight of said composition.

8. A composition according to claim 6 further containing an organic anionic detergent in amounts ranging from about 2% to about 50% by weight of said composition.

9. A process for bleaching which comprises contacting the material to be bleached with an aqueous solution of the composition of claim 6, said nitrilotricarboxylic compound being present in an amount of 0.5 to 50 parts per million of wash solution.

10. A composition according to claim 6 wherein said peroxide bleaching agent consists essentially of sodium perborate.

11. A composition according to claim 10 further containing an organic anionic detergent in amounts ranging from about 2% to about 50% by weight of said composition.

12. A process for bleaching which comprises contacting the material to be bleached with an aqueous solution of the composition of claim 10, said nitrilotricarboxylic compound being present in an amount of 0.5 to 50 parts per million of wash solution.

* * * * *